United States Patent [19]

Lowis et al.

[11] 4,264,246

[45] Apr. 28, 1981

[54] BORING TOOL FOR BORING HOLES OF SUBSTANTIAL LENGTH

[75] Inventors: Clemens Lowis, Katzem; Garrj Berstein, Erkelenz, both of Fed. Rep. of Germany

[73] Assignee: W. Hegenscheidt Gesellschaft mbH, Erkelenz, Fed. Rep. of Germany

[21] Appl. No.: 51,349

[22] Filed: Jun. 25, 1979

[30] Foreign Application Priority Data

Jun. 30, 1978 [DE] Fed. Rep. of Germany ....... 2828792

[51] Int. Cl.³ .............................................. B23B 51/04
[52] U.S. Cl. ...................................... 408/81; 175/384; 175/408; 408/705
[58] Field of Search ............... 408/705, 153, 181, 186, 408/226, 713, 147, 199, 231, 227, 81, 200, 147, 185; 175/384, 408

[56] References Cited

U.S. PATENT DOCUMENTS 4,133,399  1/1979  Herrmann ........................... 408/713

Primary Examiner—W. Donald Bray
Attorney, Agent, or Firm—W. G. Fasse; D. F. Gould

[57] ABSTRACT

The present boring head is constructed for drilling or boring deep holes or bores of substantial axial length whereby so-called veering off from the longitudinal boring axis is to be prevented. For this purpose three cutting members are distributed about the circumference of a base in such a manner that the cutting members are located at 0°, 95°, and 190° with a position tolerance of ±5° for each cutting member relative to a polar coordinate system. At least one guide rod is arranged at an angle of 55° and another guide rod is located at an angle of 305°. Each guide rod position may have a tolerance of ±10° in said polar coordinate system.

2 Claims, 2 Drawing Figures

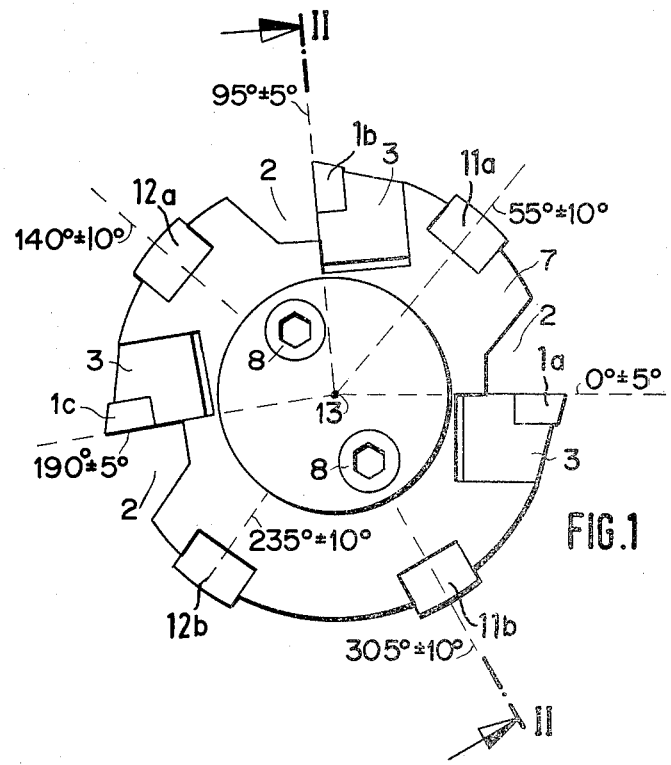
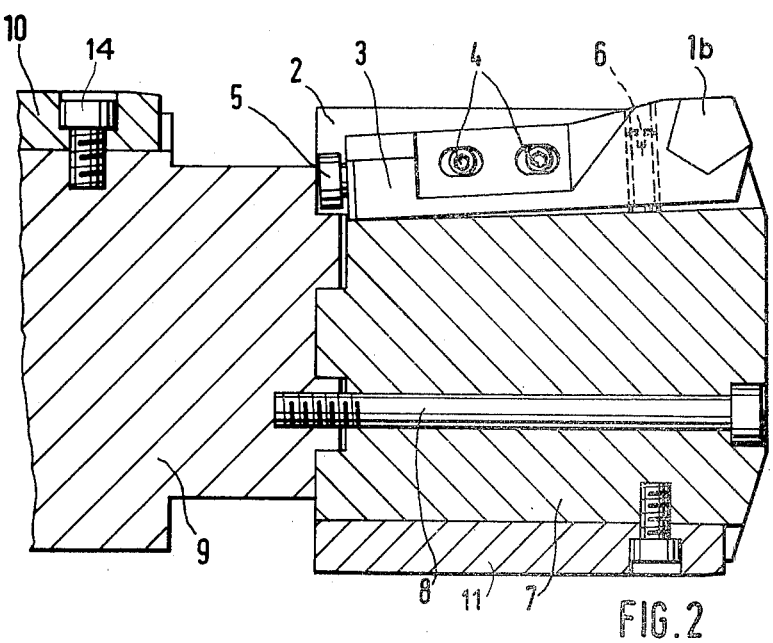

BORING TOOL FOR BORING HOLES OF SUBSTANTIAL LENGTH

BACKGROUND OF THE INVENTION

The invention relates to a bore head for boring holes having a substantial length. The bore head includes three cutting edges or members which are distributed about the circumference of a base member which also carries a plurality of guide rods. Boring heads of this type are known, for example, from German Patent Publication 2,556,977, particularly FIGS. 1 and 2 of said patent publication. German patent Publication 2,556,977; corresponds to U.S. Pat. No. 4,133,399; issued Jan. 9, 1979. These bore heads have been found to be rather reliable in practical application. However, one disadvantage of prior art bore heads calls for improvement in that the so-called veering off of prior art bore heads may be relatively substantial over the length of a bore. The subsequent machining of work pieces that have been bored or the bore of which has been enlarged becomes the more difficult the more the direction of the bore has veered off a central longitudinal bore axis.

German Pat. No. 2,057,512 discloses bore heads which comprise support and guide elements enabling the bore heads to adapt themselves to uneven bore hole walls. These support and guide elements are arranged in two planes in a tiltable manner whereby the planes extend perpendicularly to each other.

However, the prior art support and guide elements do not achieve a reduction in the so-called "veering off" of the bore relative to the longitudinal, central bore axis.

OBJECTS OF THE INVENTION

In view of the above it is the aim of the invention to achieve the following objects singly or in combination:

to construct a bore head which will achieve a substantial reduction in the so-called veering off of the bores in a work piece that needs to be bored or the bore of which needs to be increased in diameter;

to arrange the cutting edges and the guide rods in such a manner that independently of any instantaneous cutting situation a resulting force is accomplished which is effective in the zone between two guide rods;

to assure that the guide rods support the bore head in a defined manner to prevent substantially any instability that might lead to "veering off";

to avoid or control tilting and pendulum movements of the bore head; and to avoid the veering off regardless whether the tool or the work piece is stationary or when the drilling is performed in a mixed operation in which either the tool or the work piece may be stationary or rotating.

SUMMARY OF THE INVENTION

The above objects have been achieved according to the invention by placing three cutting edges in a polar coordinate system, the origin of which coincides with the longitudinal axis of the bore head in such a manner that one cutting edge is located at 0°, the second cutting edge is located at 95°, and the third cutting edge is located at 190°, each with a position tolerance of ±5° and that at least one guide rod is arranged at an angle of 55° while another guide rod is arranged at an angle of 305°, each with a position tolerance of ±10°.

In a further embodiment of the invention a third guide rod may be located at an angle of 140° and a fourth guide rod may be located at an angle of 235°, again with a position tolerance for each additional guide rod of ±10°. The just mentioned second embodiment of the invention assures a substantial reduction of the veering off even if the tool rotates and the work piece is stationary or if the boring operation is performed in a mixed manner alternately rotating the tool or the work piece.

The expression "at least one guide rod" as used herein means that it may be quite suitable to arrange within the stated angular zone and within the stated position tolerance either several guide rods or one guide rod of substantial width, for example, to achieve a more advantageous distribution of the friction load. The invention expressly includes this modification.

BRIEF FIGURE DESCRIPTION

In order that the invention may be clearly understood, it will now be described, by way of example, with reference to the accompanying drawings, wherein:

FIG. 1 is a front view of a boring head according to the invention as viewed in the direction toward the longitudinal central axis of the present bore head; and FIG. 2 is a sectional view along section line II—II in FIG. 1.

DETAILED DESCRIPTION OF PREFERRED EXAMPLE EMBODIMENTS AND OF THE BEST MODE OF THE PRESENT INVENTION

FIG. 1 shows the front face of a bore head according to the invention having a central axis 13 which forms the origin of a polar coordinate system. Three cutting plates or members 1a, 1b, and 1c are secured to the base 7 of the bore head at the angular positions mentioned above. More specifically, cutting member 1a is located substantially at 0°. Cutting head 1b is located substantially at 95° and cutting member 1c is located at 190°, whereby each position may have a tolerance of ±5°. The cutting members 1a, 1b, 1c are supported by respective cutting plate holders 3 of identical construction and located in recesses 2 of the base body 7. The recesses 2 extend longitudinally in the base body 7 and the adjustments of the cutting plates or members 1a, 1b, 1c are accomplished in the longitudinal direction by adjustment screws 5 after releasing the securing screws 4. The adjustment in the radial or cross direction is accomplished by adjustment screws 6.

The base body 7 of the boring head is secured to a boring rod 9 by means of screw bolts 8. Support elements 10 are secured to the circumference of the boring rod 9 by means of screws 14, whereby the boring rods may bear against the wall of the hole being drilled.

A first guide rod 11a is located above the first cutting member 1a at an angular position of 55°±10°. A second guide rod 11b is located at 305°±10°. With this arrangement of two guide rods the boring head according to the invention is especially suitable for boring with a stationary tool and rotating the work piece. Further guide rods are not necessary for this type of operation. It is further immaterial to the function and operation of the present tool whether the angular position is as shown in FIG. 1 with 0° extending substantially horizontally as in a unity radius circle or whether an angular displacement is used. It is only important that the angular relationship among the cutting edges relative to each other and relative to the guide rods is maintained. The angular position of the entire bore head is immaterial.

Where the tool is rotating during the boring operation and the work piece is stationary or rotated in the opposite direction, it is preferably for assuring a very small veering off to provide additional guide rods 12a and 12b. Guide rod 12a is located at an angle of 140°±10°. Guide rod 12b is located at an angle of 235°±10°. These guide rods 12a and 12b serve essentially for the purpose of taking up in the boring bushing, the shearing forces resulting from the unbalance of the boring head when it is not yet subject to the cutting loads.

It has been found that with the arrangement of the cutting edges and of the guide rods relative to each other as disclosed by this invention it has become possible to achieve for the first time a satisfactory linearity of the drilled bore and a stable operating characteristic of the present boring head.

Tests made with a stationary tool and a rotating work piece have shown in a practical application of the present invention that the veering off of the bore from an ideal central longitudinal axis has been significantly reduced. However, actual improvement figures depend on several parameters such as the characteristics of the work piece material and the operating temperature.

It has been found that during the operation or boring of work pieces by means of multi-cutting edge boring heads a resulting shearing force is effective on the boring head. Such shearing force results from the different forces effective on the cutting edges and is a variable because the individual forces effective on the cutting edges also vary continuously in their positions or rather direction, and in their size during the machining or boring operation. Thus, the resulting shearing or cross force has a direction and size which cannot be predetermined. As a matter of fact, the resulting shearing force may rotate during the machining operation. This fact is the reason for the unstable working characteristic of known multi-cutting edge boring heads.

However, the arrangement of the cutting edges according to the invention makes sure that a resulting shearing force is effective independently of the instantaneous cutting situation or conditions at each individual cutting edge. Further, the invention makes sure that this independent, resulting cross or shearing force is always located within the zone between two guide rods. In other words, the resulting cross force never moves out of this zone between two guide rods. Thus, the arrangement of the cutting edges relative to each other and relative to the guide rods is important. By the arrangement disclosed herein the boring head is always subject to a cross bore which is effective in a predetermined range, whereby the guide rods can support the boring head in a defined, suitable position thereby guiding the boring head so as to prevent the instability of the bore head which heretofore has resulted in the so-called veering off. Another advantage of the invention is seen in that the center where the work is being performed cannot be subject to excursions due to tilting and pendulum movements. Rather, the boring head according to the invention is defined in its position at all times.

Although the invention has been described with reference to specific example embodiments, it is to be understood, that it is intended to cover all modifications and equivalents within the scope of the appended claims.

What is claimed is:

1. A boring head for drilling holes of substantial axial length, comprising base means having a central longitudinal axis, first, second, and third cutting members operatively secured to said base means, a plurality of guide rod means operatively secured to said base means, said first cutting member being secured to said base means at a first position defined by 0°±5° in a polar coordinate system the origin of which coincides with said central longitudinal axis, said second cutting member being located at a second position defined by 95°±5°, said third cutting member being located at a third location defined by 190°±5°, said guide rod means comprising at least one guide rod located at an angle of 55°±10°, and another guide rod located at an angle of 305°±10°, whereby said first, second and third cutting members are arranged substantially symmetrically relative to one another but non-symmetrically relative to the 360° of said polar coordinate system, and whereby said guide rods are also arranged non-symmetrical relative to the 360° of said polar coordinate system.

2. The boring head of claim 1, wherein said guide rod means comprise a third guide rod located at an angle of 140°±10° and a fourth guide rod located at an angle of 235°±10°.

* * * * *